(12) United States Patent
Sakakibara

(10) Patent No.: US 6,204,640 B1
(45) Date of Patent: Mar. 20, 2001

(54) BATTERY CHARGER AND BATTERY CHARGING METHOD

(75) Inventor: Kazuyuki Sakakibara, Anjo (JP)

(73) Assignee: Makita Corporation (JP)

( * ) Notice: Subject to any disclaimer, the term of this patent is extended or adjusted under 35 U.S.C. 154(b) by 0 days.

(21) Appl. No.: 09/526,681

(22) Filed: Mar. 16, 2000

(30) Foreign Application Priority Data

Mar. 26, 1999 (JP) .................................................. 11-084236

(51) Int. Cl.$^7$ .................................................. H01M 10/46
(52) U.S. Cl. .......................................................... 320/150
(58) Field of Search .................................... 320/124, 125, 320/127, 128, 137, 144, 150, 152, 153

(56) References Cited

U.S. PATENT DOCUMENTS

| | | |
|---|---|---|
| 5,241,259 | 8/1993 | Patino et al. . |
| 5,497,068 | 3/1996 | Shiojima . |
| 5,652,500 | 7/1997 | Kadouchi et al. . |
| 5,659,239 | 8/1997 | Sanchez et al. . |
| 5,739,673 | 4/1998 | Le Van Suu . |
| 5,886,527 | 3/1999 | Ito . |
| 5,912,547 | 6/1999 | Grabon . |

FOREIGN PATENT DOCUMENTS

| | | |
|---|---|---|
| 200693 | 5/1993 | (DE) . |
| 0621 990 B1 | 6/1996 | (EP) . |
| 05244729 | 9/1993 | (JP) . |
| 06121468 | 4/1994 | (JP) . |
| 05171185 | 1/1995 | (JP) . |
| 07153497 | 6/1995 | (JP) . |
| 07284235 | 10/1995 | (JP) . |
| 18298140 | 11/1996 | (JP) . |
| 07134070 | 12/1996 | (JP) . |
| 08327711 | 12/1996 | (JP) . |
| 10014125 | 1/1998 | (JP) . |
| WO 91/08604 | 6/1991 | (WO) . |
| WO 95/09471 | 4/1995 | (WO) . |

*Primary Examiner*—Edward H. Tso
(74) *Attorney, Agent, or Firm*—Welsh & Katz, Ltd.; Thomas W. Tolpin

(57) ABSTRACT

A temperature rise pattern is retrieved from charging time based on the difference between a battery temperature at the beginning of battery charge and a target temperature value which a battery is intended to reach (in S116). The battery is charged while adjusting a current value so that a temperature rise value becomes the temperature rise pattern (in S118 and S120). Thus, by optimizing the temperature rise pattern, it is possible to charge the battery so that the temperature at the time of the completion of battery charge becomes the target temperature value (the lowest temperature value).

11 Claims, 15 Drawing Sheets

Fig. 13
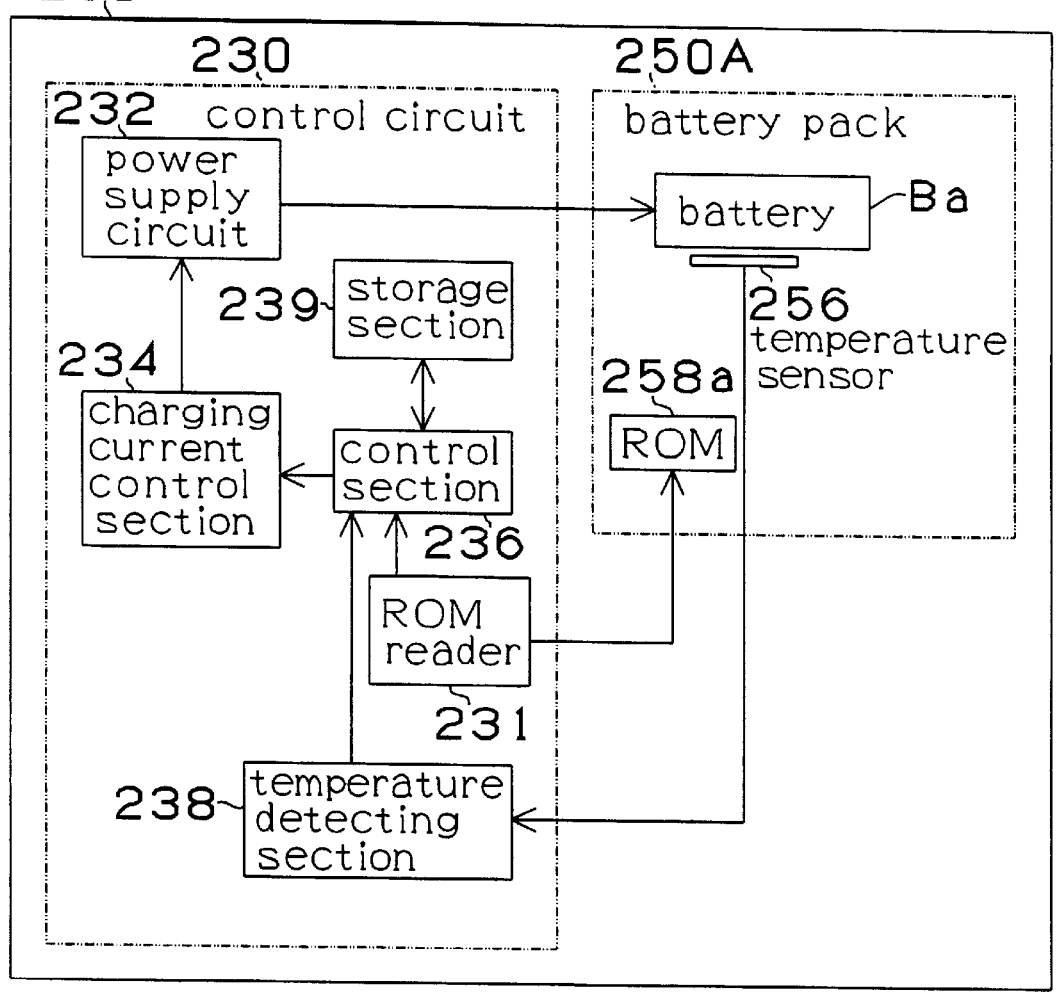
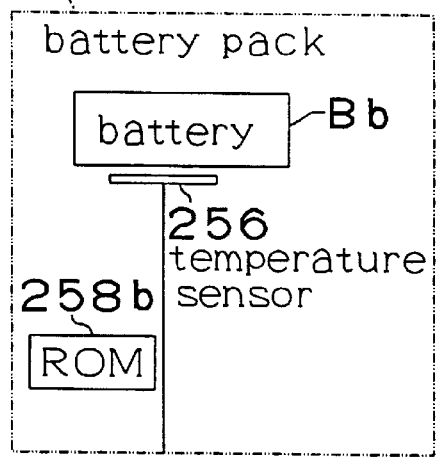

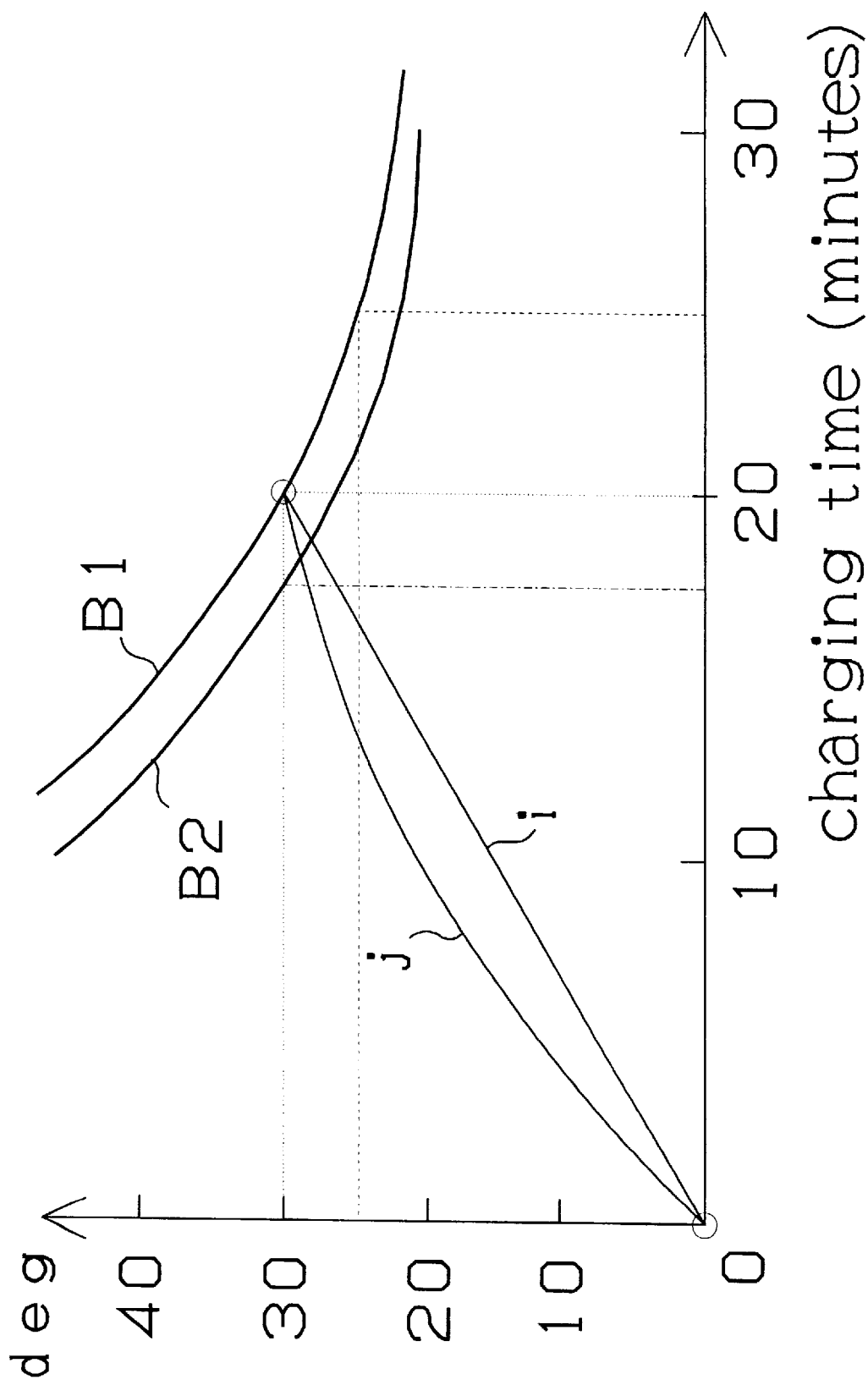

BATTERY CHARGER AND BATTERY CHARGING METHOD

BACKGROUND OF THE INVENTION

1. Filed of the Invention

The present invention relates to a battery charger and a battery charging method for charging a battery and particularly relates to a battery charger and a battery charging method suited for charging a battery, such as a nickel metal hydride battery, which emits high heat while being charged.

2. Discussion of the Prior Art

Presently, a chargeable battery which can be repeatedly used for the power supply of, for example, a power tool is used.

A nickel cadmium battery is popular as a battery for the power tool, and a battery charger for quickly charging the battery by applying high current thereto is used. Specifically, the battery is quickly charged in about 20 minutes and a power tool can be continuously used by switching a battery to that which has been charged.

The inventor of the present invention studied improving the performance of a power tool by using a nickel metal hydride battery as a battery therefor. Although the nickel metal hydride battery can increase a capacity compared to a nickel cadmium battery, it generates high heat while being charged. If the temperature of the battery becomes high by the generated heat, the electrodes and separators of the cells within the battery deteriorate and battery life is shortened. Due to this, it is impossible to quickly charge the nickel metal hydride battery with high current as done for the nickel cadmium battery stated above.

SUMMARY OF THE INVENTION

The present invention has been made to solve the above-stated problems and an object of this invention is to provide a battery charger and a battery charging method capable of appropriately charging a battery in a short time while suppressing the temperature rise of the battery which is being suppressed.

In order to accomplish the said object, a battery charger according to the present invention characterized by comprising:

- a temperature detecting section for detecting a present battery temperature;
- a temperature rise value outputting section for obtaining a temperature rise value from the temperature detected by said temperature detecting section;
- a current value retrieving section for retrieving a current value with which the temperature rise value outputted from said temperature rise value outputting section is constant; and
- a charge control section for charging a battery with the current value retrieved by said current value retrieving section.

In order to accomplish the said object, a battery charger according to the present invention characterized by comprising:

- a storage device storing a target temperature value which a battery temperature is intended to reach;
- a temperature detecting section for detecting a present battery temperature;
- a temperature gradient calculating section for calculating a temperature rise gradient from charging time based on a difference between a battery temperature at the beginning of battery charge and said target temperature value held by said storage device;
- a temperature rise value outputting section for obtaining a temperature rise value from the temperature detected by said temperature detecting section;
- a current value retrieving section for retrieving a current value with which the temperature rise value outputted from said temperature rise value outputting section becomes said temperature rise gradient; and
- a charge control section for charging the battery with the current value retrieved by said current value retrieving section.

In order to accomplish the said object, a battery charger according to the present invention characterized by comprising:

- a storage device storing a target temperature value which a battery is intended to reach;
- a temperature detecting section for detecting a present battery temperature;
- a temperature rise pattern retrieving section for retrieving a temperature rise pattern for completing battery charge at said target temperature value based on a difference between a battery temperature at the beginning of the battery charge and said target temperature value held by said storage device;
- a temperature rise value outputting section for obtaining a temperature rise value from the temperature detected by said temperature detecting section;
- a current value retrieving section for retrieving a current value with which the temperature rise value outputted from said temperature rise value outputting section becomes said temperature rise pattern; and
- a charge control section for charging the battery with the current value retrieved by said current value retrieving section.

In accordance with the more preferred teaching of the present invention, said temperature rise pattern is such that the temperature rise value is relatively high in a first half of battery charge and is relatively low in a second half of battery charge.

In accordance with the more preferred teaching of the present invention, said temperature rise pattern is approximated polygonally.

In accordance with the more preferred teaching of the present invention, said target temperature value is a value for completing the battery charge at the lowest temperature.

A battery charging method for making a battery side hold information on a target temperature value, which a battery is intended to reach, corresponding to charging time and charging the battery by means of a battery charger in accordance with the target temperature value, according to the present invention characterized in that said battery charger comprises:

- a storage device storing a temperature rise pattern for completing battery charge at the target temperature value read out from the battery side;
- a temperature detecting section for detecting a present battery temperature;
- a temperature rise pattern retrieving section for retrieving a temperature rise pattern from said storage device based on a battery temperature at the beginning of the battery charge and charging time;
- a temperature rise value outputting section for obtaining a temperature rise value from the temperature detected by said temperature detecting section;

a current value retrieving section for retrieving a current value with which the temperature rise value outputted from said temperature rise value outputting section becomes said temperature rise pattern; and a charge control section for charging the battery with the current value retrieved by said current value retrieving section.

In accordance with the more preferred teaching of the present invention, said target temperature value is a value for completing the battery charge at the lowest temperature.

A battery is charged while adjusting a current value so that a temperature rise value may be constant. This makes it possible to charge the battery so that a battery temperature at the time of the completion of charge becomes a predetermined value. It is, therefore, possible to charge a nickel metal hydride battery or the like which has large temperature increase in a short time without increasing the battery temperature.

A temperature rise pattern is retrieved from charging time based on the difference between a battery temperature at the beginning of battery charge and a target temperature value which the battery is intended to reach and which is held by a storage device. The battery is then charged while adjusting a current value so that a temperature rise value may become the temperature rise pattern. Due to this, by optimizing the temperature rise pattern, it is possible to charge the battery so that a battery temperature at the time of the completion of charge may become a predetermined value. It is, therefore, possible to charge a nickel metal hydride battery or the like, which has large temperature increase, in a short time without increasing the battery temperature.

A temperature rise pattern is retrieved from charging time based on the difference between a battery temperature at the beginning of battery charge and a target temperature value which a battery is intended to reach and which is held by a storage device. The battery is then charged while adjusting a current value so that a temperature rise value may become the temperature rise pattern. Due to this, by optimizing the temperature rise pattern, it is possible to charge the battery so that a temperature at the time of the completion of charge may become the target temperature value which the battery is intended to reach (the lowest temperature).

A temperature rise pattern is set such that the difference between a battery temperature and an ambient temperature is small, a battery is difficult to cool, battery capacity is almost empty, temperature rise during battery is relatively small and a temperature rise value is relatively high in the first half of the battery charge, and set conversely such that the difference between the battery temperature and the ambient temperature is large, the battery is easily cooled, temperature rise during battery charge is relatively large and the temperature rise value is relatively low in the second half of the battery charge. That is, by setting the temperature rise pattern so as to optimize them altogether in cooperation with one another, it is possible to charge the battery so that the battery temperature at the time of the completion of charge may become the lowest temperature.

Since a temperature rise pattern is approximated polygonally, processing such as arithmetic processing can be easily carried out.

A target temperature value which the temperature is intended to reach is a value for completing battery charge at the lowest temperature and allows charging the battery so that a battery temperature at the completion of charge may become the lowest temperature.

A temperature rise pattern is retrieved from charging time based on the difference between a battery temperature at the beginning of battery charge and a target temperature value which the battery is intended to reach and which is held by the storage device. The battery is then charged while adjusting a current value so that the temperature rise value may become the temperature rise pattern. Due to this, by optimizing the temperature rise pattern, it is possible to charge the battery so that the temperature at the time of the completion of charge may become the target temperature value which the battery is intended to reach (the lowest temperature).

Further, since the battery side holds data on the target temperature value which the battery is intended to reach, it is possible to charge different types of batteries so that temperatures at the time of the completion of charge may become the target temperature values (the lowest temperatures), respectively. In various types of battery chargers, even a battery charger capable of quickly charging a battery in, for example, 15 minutes or that capable of charging a battery in one hour, it is possible to charge the battery so that the battery temperature at the time of the completion of charge may become the target temperature value which the battery is intended to reach (the lowest temperature).

Target temperature value which the battery is intended to reach is a value for completing battery charge at the lowest temperature and allows charging the battery so that the temperature at the time of the completion of charge may become the lowest temperature value.

BRIEF DESCRIPTION OF THE DRAWINGS

FIG. 13 is a block diagram showing the control circuit of a battery charger in the third embodiment.

FIG. 15 is an explanatory view showing the control principle of a battery charging method in the third embodiment.

DESCRIPTION OF THE PREFERRED EMBODIMENTS

Battery chargers and battery charging methods according to the embodiments of the present invention will be described hereinafter with reference to the accompanying drawings.

The embodiments which embody the present invention will now be described with reference to the accompanying drawings.

Figure 1:
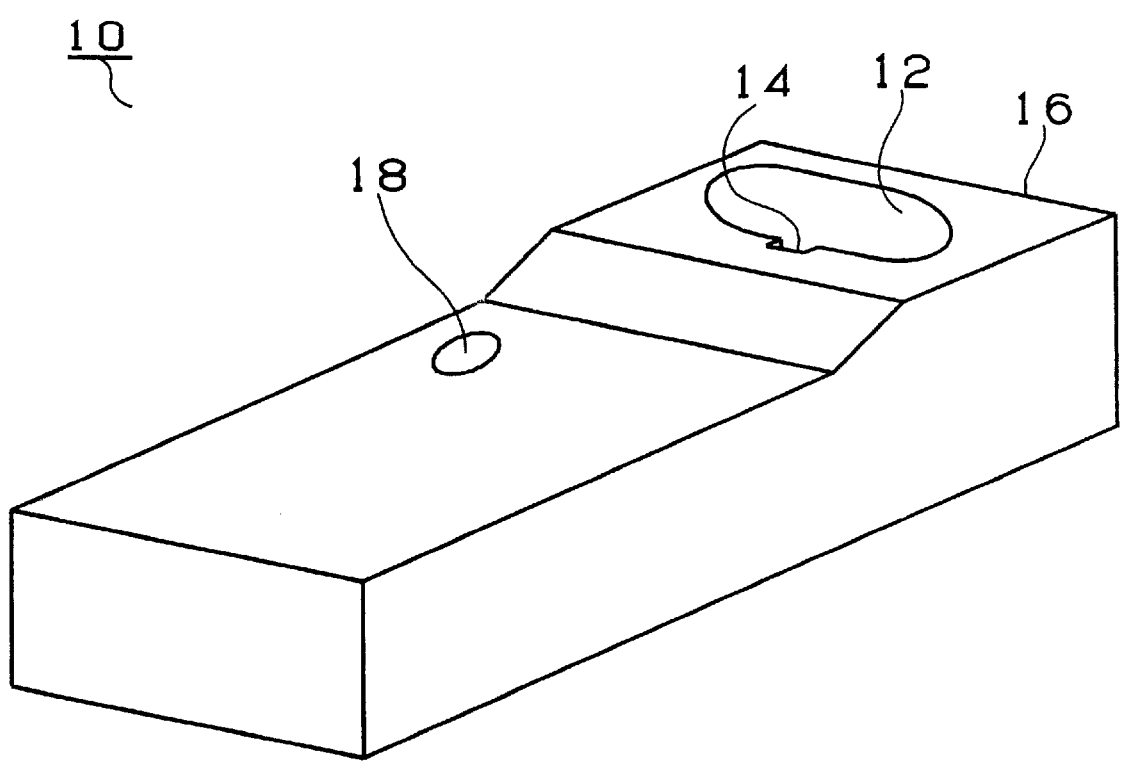
FIG. 1 is a perspective view of a battery charger in embodiments according to the present invention.
Figure 2:
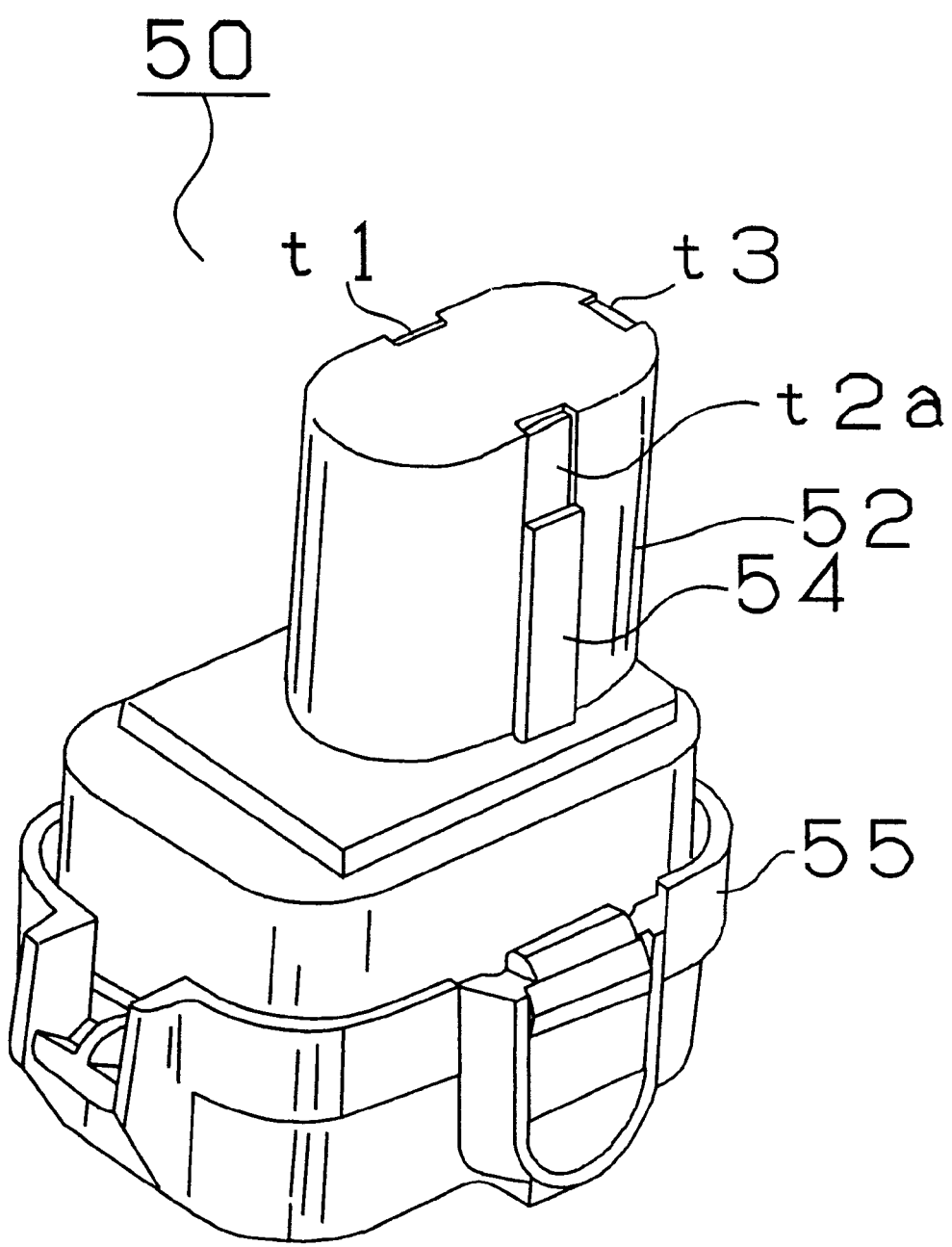
FIG. 2 is a perspective view of a battery pack in the embodiments according to the present invention.
Figure 3:
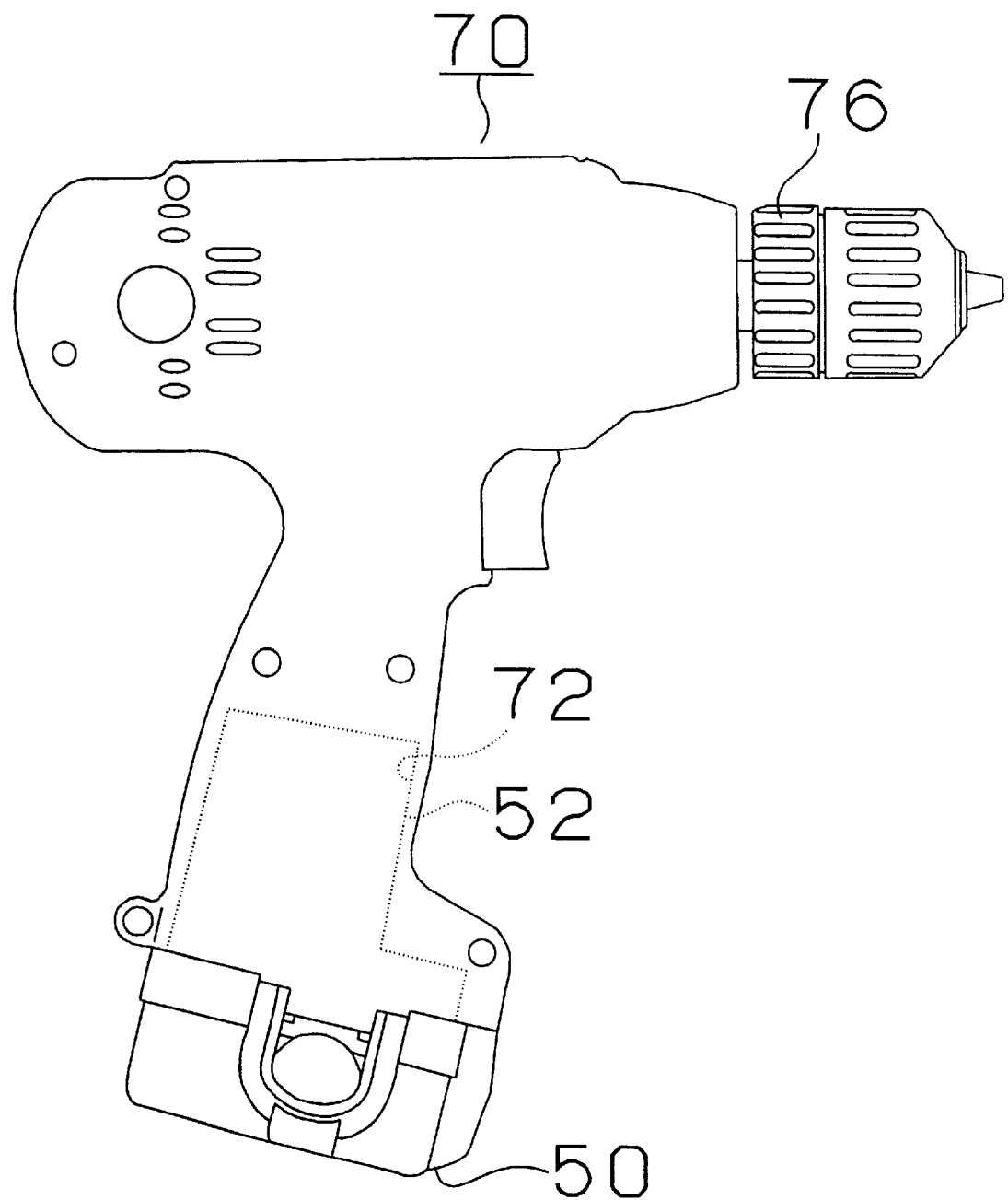
FIG. 3 is a perspective view of a battery drill employing the battery pack shown in FIG. 2.

FIG. 1 shows a battery charger 10 in the first embodiment of the present invention, FIG. 2 shows a battery pack 50 charged by the battery charger 10 and FIG. 3 shows a battery drill 70 driven by the battery pack 50.

As shown in FIG. 2, the battery pack 50 containing a nickel metal hydride battery cell consists of a generally cylindrical fitted part 52 and a generally prismatic base 55. A key-shaped key part 54 is formed on the side of the fitted part 52 and the first input terminal t1 connected to the positive electrode of the battery, the second input terminal t2a connected to the negative electrode thereof and the third terminal t3 connected to a temperature sensor consisting of a thermistor are arranged on the upper portion of the fitted part 52.

As shown in FIG. 1, the battery charger 10 charging the battery packs 50 is provided with a fitting hole 12 into which the fitted part 52 of the battery pack 50 is fitted. A keyway 14 for introducing the key part 54 of the fitted part 52 is formed on the sidewall of the fitting hole 12. The fitting hole 12 is resin molded integrally with a housing 16 forming the battery charger 10. In this embodiment, the key part 54 is provided at the fitted part 52 of the battery pack 50 and the keyway 14 is provided at the fitting hole 12 of the battery charger 10, thereby preventing the battery pack 50 from being installed in a wrong direction. The first to third output terminals, which are not shown, are provided at the bottom of the fitting hole 12 to contact with the first to third terminals t1, t2a and t3 of the battery pack 50, respectively. An LED lamp 18 is provided on the upper portion of the battery charger 10 to indicate that battery charge is being conducted.

As shown in FIG. 3, the battery drill 70 is provided with a fitting hole 72 into which the fitted part 52 of the battery pack 50 is fitted, and is constituted to rotate a chuck 76 by a motor, which is not shown, when supplied with power from the first input terminal t1 and the second input terminal t2a of the battery pack 50. When the battery drill 70 is used, a plurality of batteries in the battery pack 50 which are completed with charge are sequentially used so that the battery drill 70 can continuously operate. To this end, the battery charger in this embodiment is constituted to be capable of quickly charging the battery pack 50 in about 30 minutes.

Figure 4:
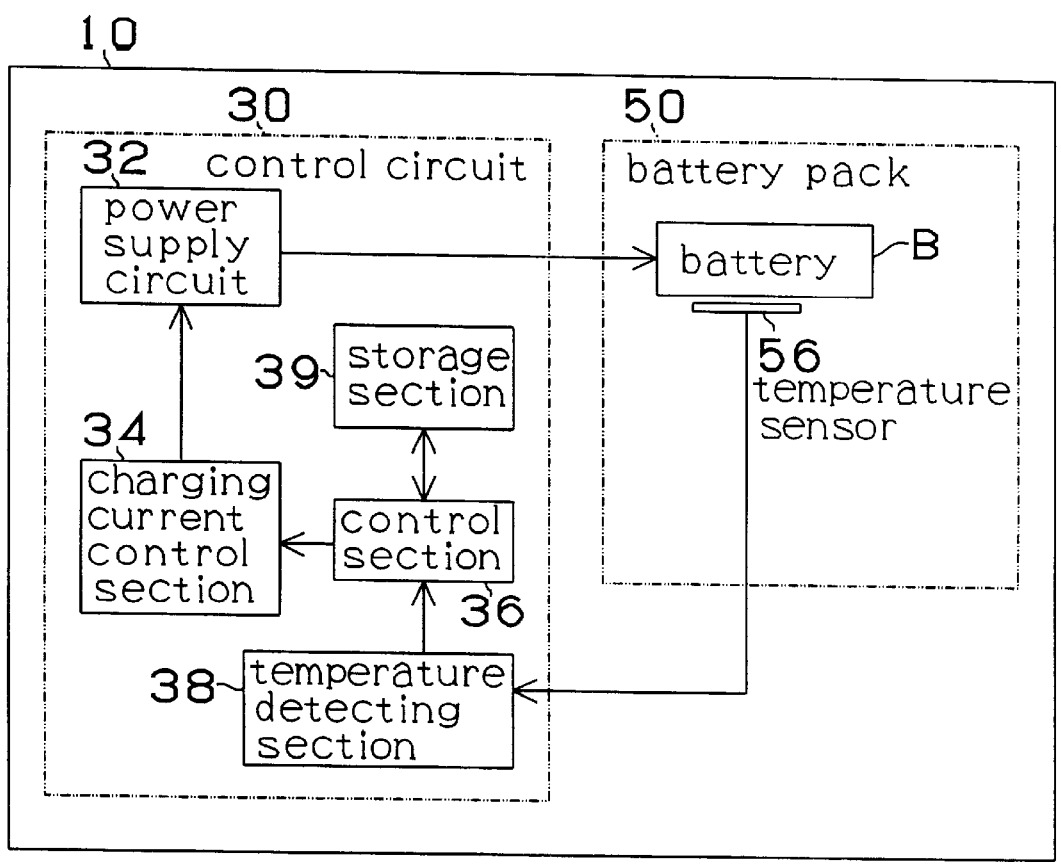
FIG. 4 is a block diagram showing a control circuit in the battery charger shown in FIG. 1.

FIG. 4 shows the configuration of a control circuit 30 in the battery charger 10. The control circuit 30 consists of a temperature detecting section 38 detecting a battery temperature from an output value from a temperature sensor (thermistor) 56 provided at the battery pack 50 side, a storage section 39 storing current value control information to be described later, a control section 36 differentiating the temperature value outputted from the temperature detecting section 38, obtaining a temperature rise value, obtaining a current value with which a battery is chargeable while suppressing the temperature rise value and outputting the current value as a current command value to a charging current control section 34, and the charging current control section 34 controlling a power supply circuit 32 based on the current command value from the control section 36 and adjusting battery charging current.

Next, the operation principle of the battery charger in the first embodiment will be described.

If charging current for a battery increases, charging time becomes shorter but temperature rise becomes larger. Conversely, if charging current decreases, charging time becomes longer but temperature rise becomes smaller. A nickel metal hydride battery, in particular, has characteristics that a temperature gradient (temperature rise value) varies greatly with charging current and the already charged capacity. Due to this, in this embodiment, battery charge is conducted while changing the current value so as to suppress temperature rise. In other words, the conventional battery charger charges a battery with a fixed current value, whereas the battery charger in this embodiment determines the state of a battery based on a temperature rise value and charges the battery while changing the current value with which the temperature rise of the battery is made fixed, that is, while changing the current value according to the temperature rise of the battery.

In this embodiment, if battery temperature is high, relatively low charging current is applied to the battery. If the battery temperature is low, relatively high charging current is applied thereto.

Figure 5:
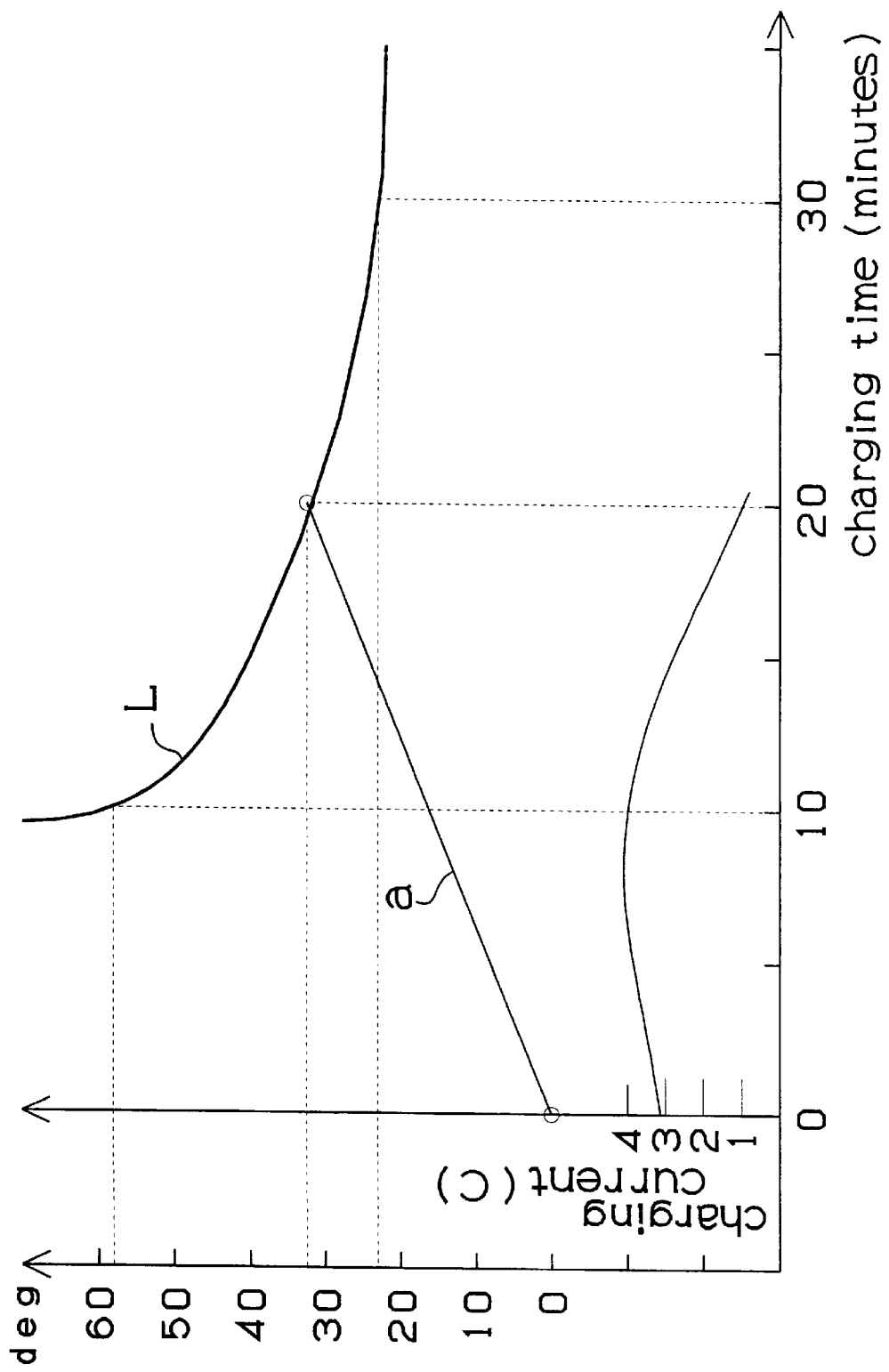
FIG. 5 is an explanatory view for the charge principle of a battery charger in the first embodiment according to the present invention.

The operation principle of the battery charger in the first embodiment will be described in more detail with reference to FIG. 5. In FIG. 5, the vertical axis indicates battery temperature rise values and the horizontal axis indicates charging time. A curve L therein shows temperature rise values at the time of the completion of battery charge corresponding to the charging time while the battery is charged so that the temperature rise value may be constant. The curve L indicates, for instance, that if current is controlled so that the battery temperature which starts at 20° C. may reach 53° C. (a temperature rise value of 33 degrees), charging time is 20 minutes, if current is controlled so that the battery temperature may reach 43° C. (a temperature rise value of 23 degrees), charging time is 30 minutes and that if current is controlled so that the battery temperature may reach 78° C. (a temperature rise value of 58 degrees), charging time is 10 minutes.

That is, it is possible to obtain a temperature rise value (gradient) from the charge completion time and the battery temperature rise value at the time of the completion of battery charge based on the curve L. For example, to complete battery charge in 20 minutes, battery charge may be conducted so as to have a temperature gradient (temperature rise value) indicated by a straight line a which connects 0 deg in FIG. 5 and 33 deg on the curve L. In this case, battery charge is completed almost exactly in 20 minutes when the battery temperature becomes 53° C. (a temperature rise value becomes 33 deg).

The same thing is true for a case where battery charge is completed in 20 minutes at an outside air temperature of 10° C. and a battery temperature of 10° C. Namely, the battery may be charged so as to have a temperature gradient (temperature rise value) indicated by the solid line a which connects 0 deg in FIG. 5 and 33 deg on the curve L. In this case, battery charge is completed at a temperature of 43° C. (a temperature rise value of 33 deg).

Likewise, in case of completing battery charge in 20 minutes at an outside temperature of 30° C. and a battery temperature of 30° C., the battery may be charged so as to have a temperature gradient (temperature rise value) indicated by the solid line a which connects 0 deg in FIG. 5 and 33 deg on the curve L. In this case, battery charge is completed at a temperature of 63° C. (a temperature rise value of 33 deg).

Now, the change of the current value while the above-stated temperature rise value is made constant will be described with reference to FIGS. 6 and 7.

Figure 6:
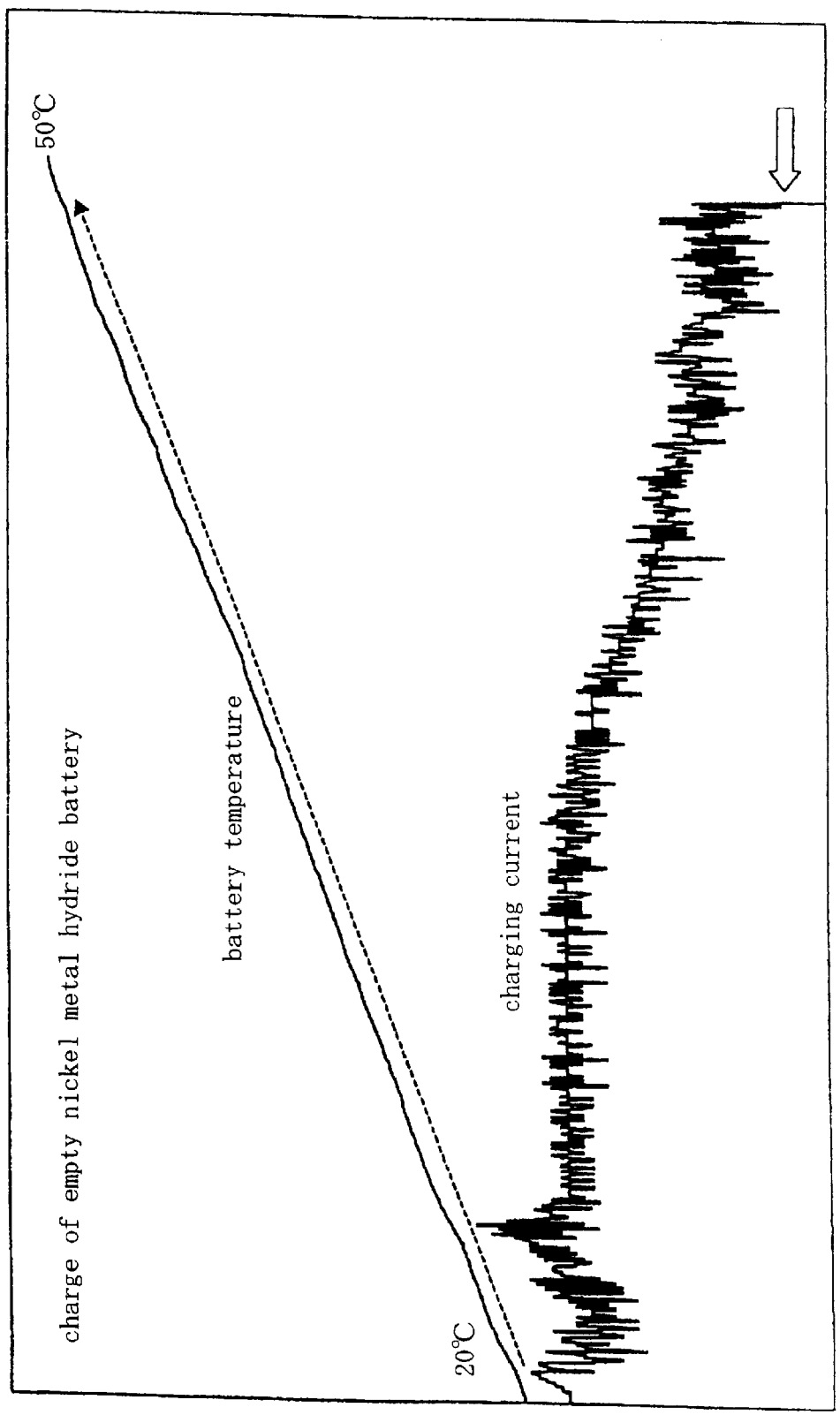
FIG. 6 is a graph showing the changes of charging current and battery temperature controlled by the battery charger.

FIG. 6 shows a simulation result when charging a nickel metal hydride battery in 25 minutes so that the battery temperature of 20° C. becomes 50° C. To make a temperature rise value constant, it is necessary to frequently adjust a charging current value. FIG. 6 indicates that the current value is relatively high in the first half of battery charge and gradually lower in the second half of battery charge. Here, the charging current is greatly decreased at a temperature of about 50° C., which indicates that the nickel metal hydride battery is completed with charge. In this embodiment, if this phenomenon is detected, battery charge is completed.

Figure 7:
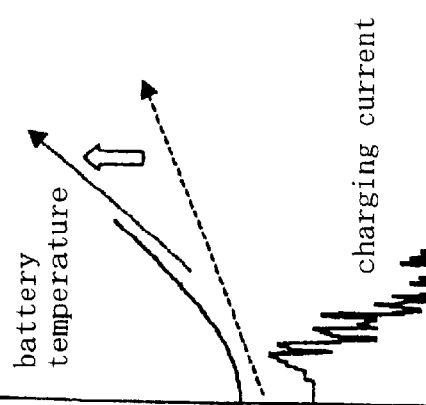
FIG. 7 is a graph showing the changes of charging current and battery temperature controlled by the battery charger.

FIG. 7 shows a simulation result for another nickel metal hydride battery. When the nickel metal hydride battery is fully charged, a phenomenon referred to as "overshoot" when battery temperature suddenly rises due to the past charging record, not due to the present charging current, may occur to the nickel metal hydride battery. When the overshoot occurs, the temperature rise value cannot be made no more than a constant value even if the current value is lowered. In this embodiment, battery charge can be completed even if this phenomenon is detected.

Figure 8:
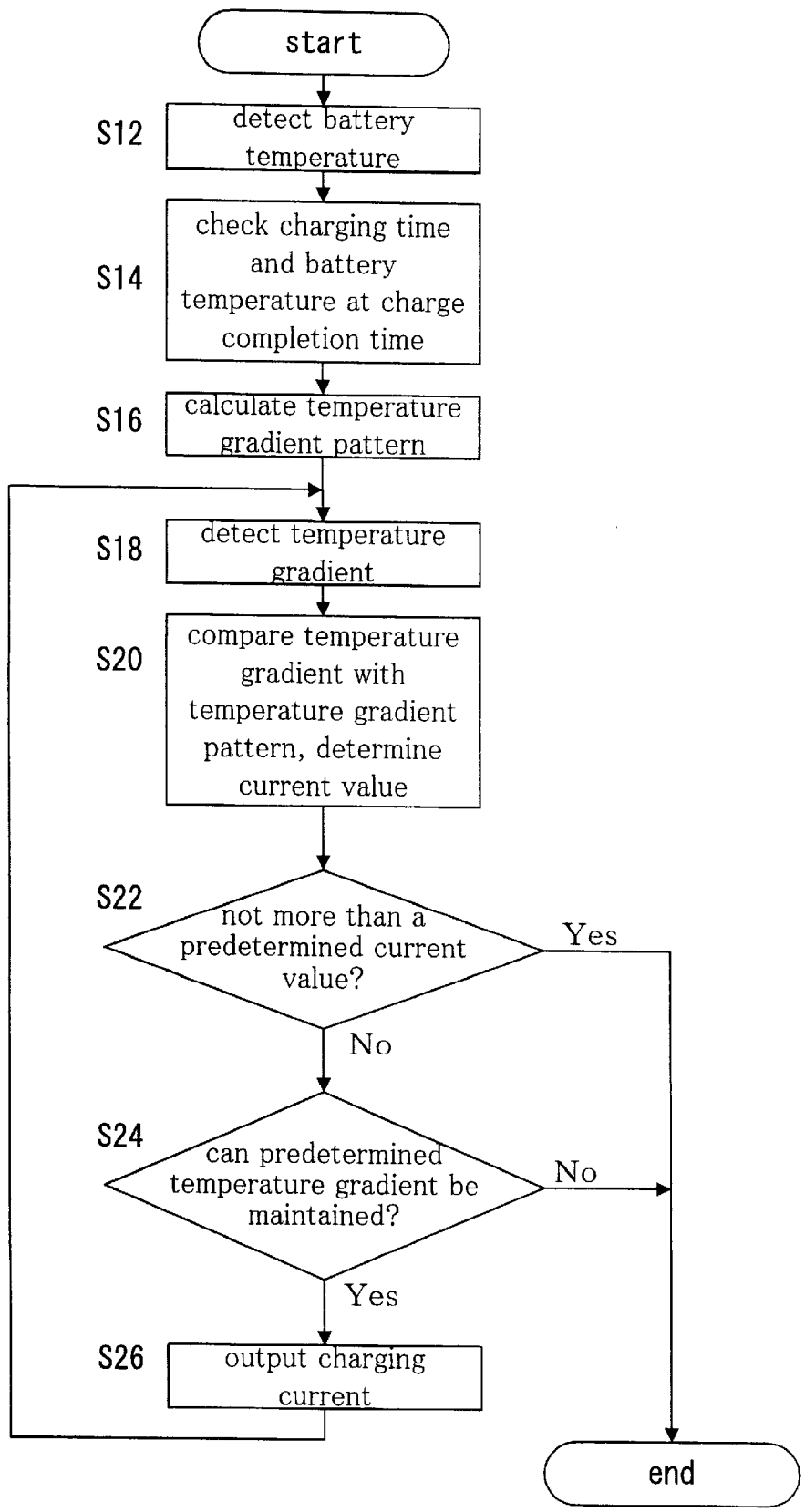
FIG. 8 is a flow chart showing processing in the control section of the battery charger in the first embodiment.

Next, battery charge conducted by the battery charger in the first embodiment will be described with reference to the flow chart of FIG. 8 showing the processing.

First, the control section 36 detects the temperature of the battery pack 50 through the temperature detecting section 38 (in S12). Here, it is assumed that an outside air temperature and a battery temperature is 20° C. Next, charging time and charge completion time are checked (in S14). The battery charger in this embodiment is constituted to switch battery charge between quick charge (20-minute charge) and normal charge (30-minute charge). If battery charge is set at the quick charge, the storage section 39 which holds the values of the curve L described above with reference to FIG. 5 is retrieved to thereby obtain a battery temperature of 53° C. at the time of charge completion. Thereafter, a temperature gradient is calculated (in S16). Here, the gradient of the straight line a connecting 0 deg and 33 deg on the curve L shown in FIG. 5 is obtained.

The control section 36 differentiates the difference between the temperature value inputted from the previous temperature detecting section and the temperature value inputted this time and obtains a temperature rise value (in S18). The control section 36 then compares this detected temperature rise value with the gradient calculated in the step 16 and thereby determines a current value (in S20). Here, if the temperature rise value is lower than the gradient, the current value is increased from the present value. If lower, the current value is decreased.

Next, it is determined whether the current value is not more than a predetermined value (in S22). As described above with reference to FIG. 6, if battery charge is completed and the current value becomes no more than the predetermined value ("Yes" in S22), charge processing is ended. If the current value is not less than the predetermined value ("No" in S22), it is further determined whether a predetermined temperature gradient can be maintained by adjusting the current value, i.e., whether overshoot stated above with reference to FIG. 7 occurs (in S24). If overshoot occurs ("No" in S24), the processing is ended. If overshoot does not occur ("Yes" in S24), the processing goes to a step 26, whereafter the battery is charged with the current value determined in the step 20 and the charge processing is continued further.

The battery charger in the first embodiment advantageously facilitates charge processing since the temperature rise value is made constant. Furthermore, the battery charger charges the battery while adjusting the current value so that the temperature rise value becomes the calculated temperature rise gradient. Thus, it is possible to charge the battery so that the temperature at the time of the completion of charge may become a target temperature value which the battery is intended to reach and to charge a nickel metal hydride battery or the like which has large temperature increase in a short time without increasing the battery temperature.

In this embodiment, the curve L shown in FIG. 5 is held by the battery charger. It is also possible to hold only the highest charge temperature (e.g., 30 deg) in a range in which the life of the nickel metal hydride battery is not shortened and charging time (e.g., 25 minutes) corresponding to a temperature rise value of 30 deg, to thereby control battery charge to be completed with the temperature rise value of 30 deg. It is also possible to further simplify the structure of the battery charger, to keep the temperature gradient of the battery constant and to charge the battery with this temperature gradient.

Next, a battery charger in the second embodiment according to the present invention will be described with reference to FIGS. 9 to 12. The battery charger in the first embodiment stated above adjusts a current value so as to make a temperature rise value constant. The battery charger in the second embodiment, by contrast, adjusts a current value so that battery temperature increases along a predetermined pattern.

Figure 9:
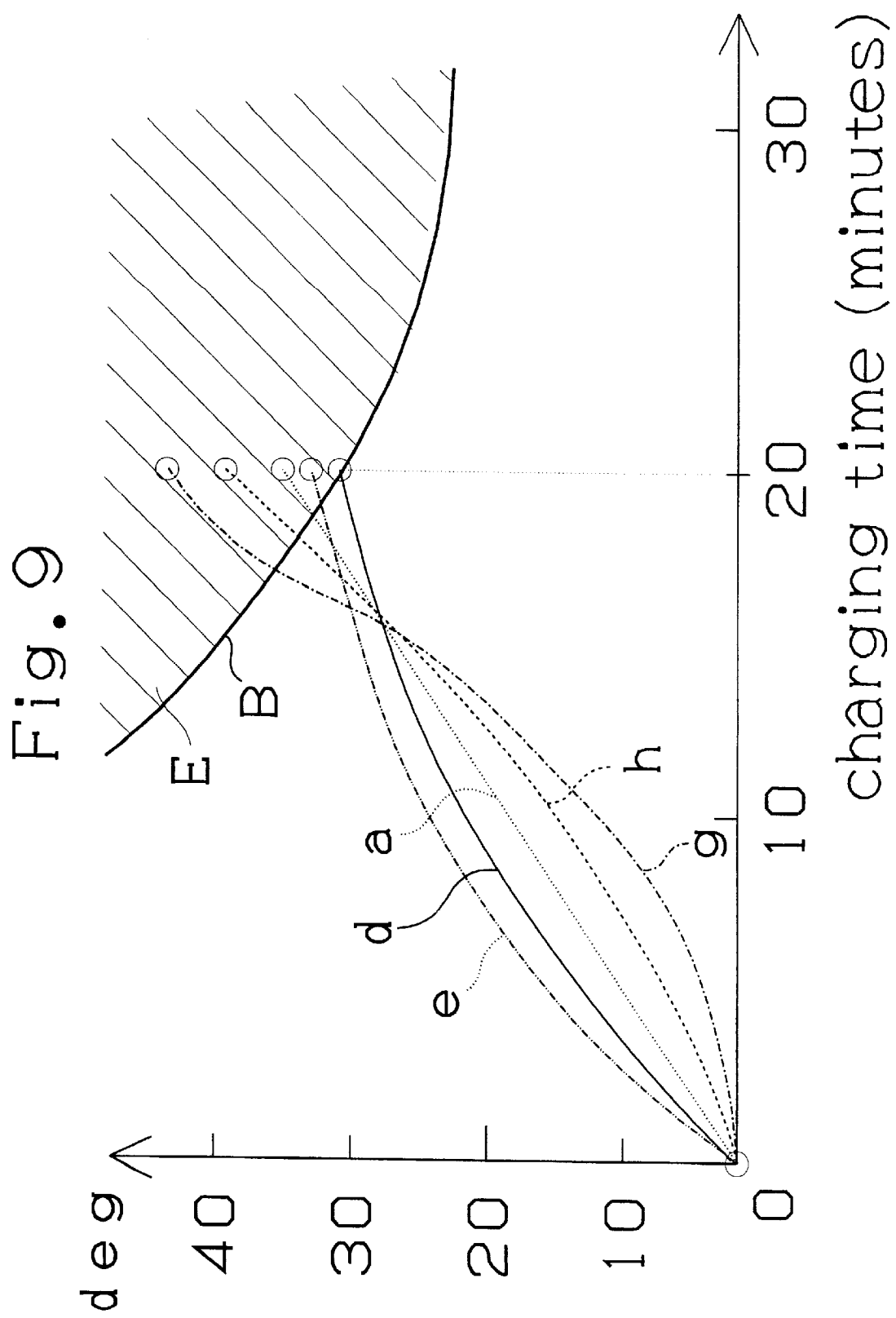
FIG. 9 is an explanatory view for the charge principle of a battery charger in the second embodiment.

The principle of this battery charge will be described with reference to FIG. 9. In FIG. 9, the vertical axis indicates temperature rise values and the horizontal axis indicates charging time. A hatched area E indicates a temperature rise value and charging time at the time of the completion of charge. If, for example, a temperature gradient indicated by symbol a is made constant to complete battery charge in 20 minutes as done by the battery charger in the first embodiment, the temperature of the battery becomes 33 deg at the time of the completion of battery charge. On the other hand, if the battery is charged so that the temperature rise value is along an upward round pattern as indicated by a solid lined in FIG. 9, the battery charge can be completed with a temperature rise value of 30 deg. Also, if the battery is charged so that a temperature rise value is along a more upward round pattern than the solid line d, the battery charge can be completed at a temperature rise value of 32 deg. Conversely, if the battery is charged along a trough pattern as indicated by a broken line h, the battery charge is completed at a temperature rise value of 38 deg. If the battery is charged so that a temperature rise value does not conform with a specific pattern as indicated by a dashed line g, the battery temperature rise value increases nearly 43 deg.

That is to say, the hatched area E indicates temperature rise values and charge time of the completion of battery charge when the battery is charged under various conditions. The border line B of the area E indicates the final temperature rise value when the battery charge is completed at the lowest temperature. If the temperature rise value is made constant in the case of the first embodiment, the broken line a shown in FIG. 9 shows that the temperature rise value is 33 deg. If the temperature rise value is along the slightly upward round temperature rise pattern indicated by the solid line d, the battery can be charged at the lowest temperature rise value (30 deg). The reason the battery can be charged at lower temperature when the temperature rise value is along the upward round pattern, than when the temperature rise value is made constant, is considered as follows. The temperature rise pattern is set such that the difference between the battery temperature and the ambient temperature is small, the battery is difficult to cool, the capacity is nearly empty, temperature rise during battery charge is relatively small and the temperature rise value is relatively high in the first half of the battery charge, and set conversely such that the difference between the battery temperature and the ambient temperature is large, the battery is easily cooled, temperature rise during battery charge is relatively large and the temperature rise value is relatively low in the second half of the battery charge. That is, by setting the temperature rise pattern so as to optimize them altogether in cooperation with one another, it is possible to charge the battery so that the battery temperature at the time of the completion of charge may be the lowest. In this embodiment, the battery charge is conducted while adjusting the current value in accordance with the temperature rise pattern with which battery charge can be completed at the lowest temperature based on the above experiment.

Figure 10:
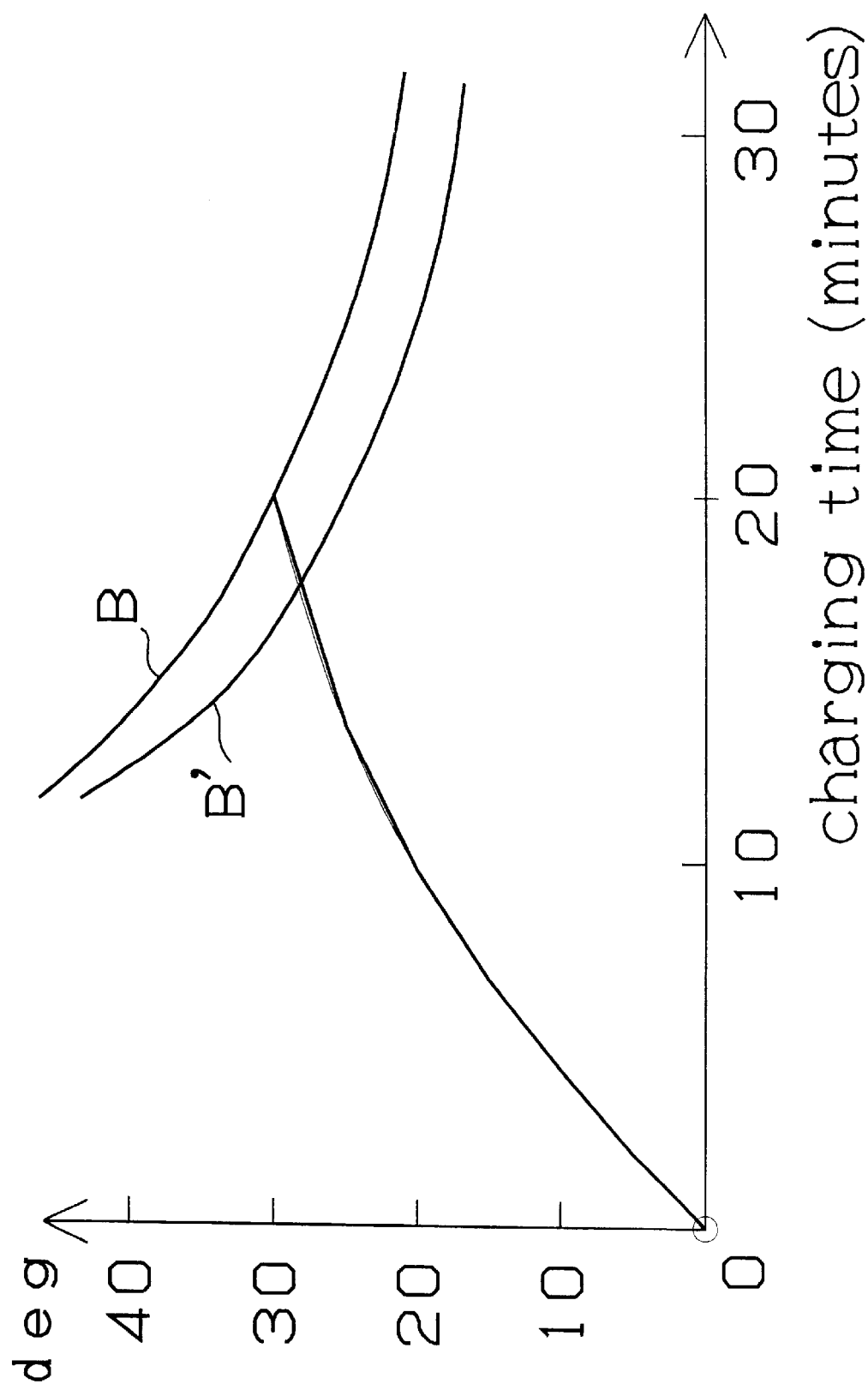
FIG. 10 is an explanatory view for the control principle of the battery charger in the second embodiment.

FIG. 10 shows the change of the border line B in accordance with the battery temperature. In FIG. 10, the border line B indicates that outside air temperature (20° C.) is equal to the battery temperature. A border line B' indicates that the battery temperature (20° C.) is higher than the outside air temperature (15° C.). In this case, the border line B' is shifted downward from the border line B by 5° C.

Figure 11:
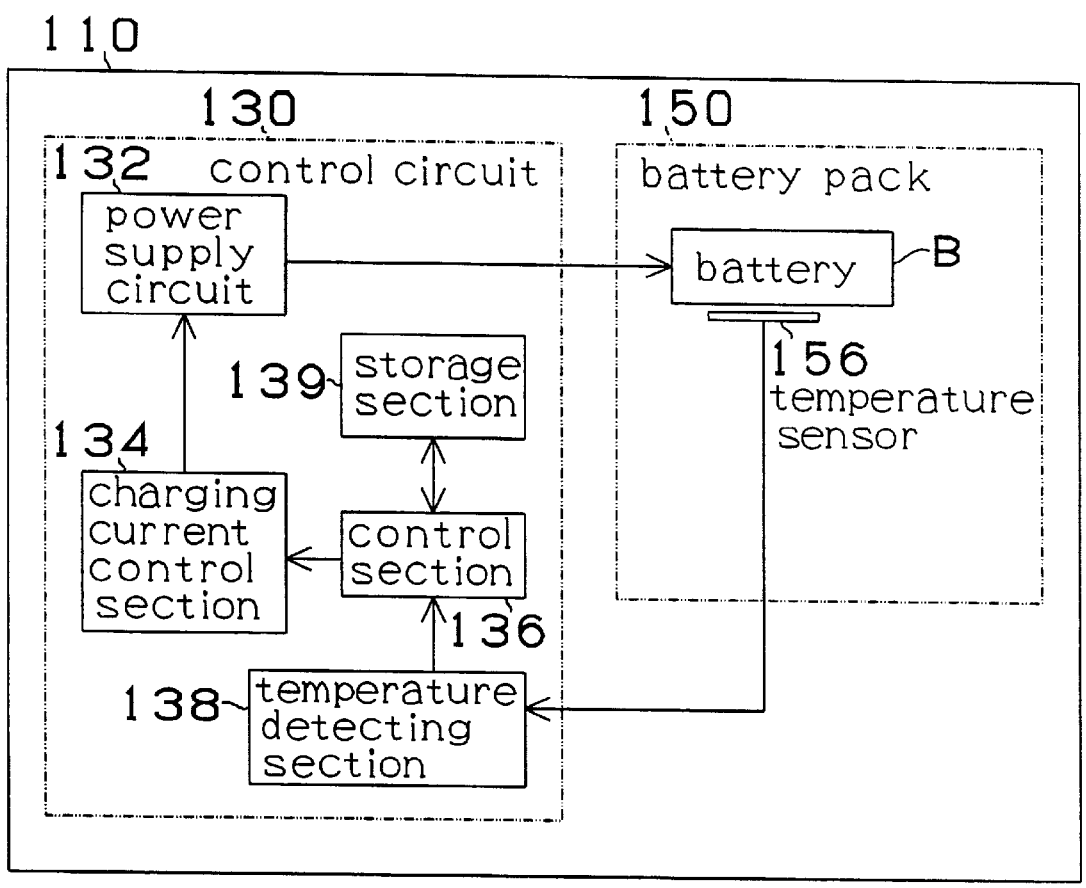
FIG. 11 is a block diagram showing the control circuit of the battery charger in the second embodiment.

FIG. 11 shows the configuration of a control circuit 130 in a battery charger 110 in the second embodiment. The control circuit 130 is the same as that in the first embodiment stated above with reference to FIG. 4. However, unlike the first embodiment, the storage section 139 of the control circuit 130 in the second embodiment holds a temperature rise pattern stated above with reference to FIG. 9. This temperature rise pattern which is approximated polygonally in a certain time in which the temperature rises 5 deg, is held by the storage section. For example, in case of the temperature rise pattern indicated by the solid lined stated above with reference to FIG. 9, the battery temperature pattern rises 5 deg in two minutes, 10 deg in four minutes, 15 deg in six minutes, 20 deg in nine minutes, 25 deg in 13 minutes and 30 deg in 20 minutes, that is, the pattern is held in the data format of (2, 4, 6, 9, 13, 20), whereby the capacity of the storage section is intended to be reduced and the arithmetic processing of the control section 136 is intended to be simplified. At the time of temperature control, the charging current is adjusted so as to follow a gradient approximated for every 5 deg as shown in FIG. 10.

In case of charging the battery at a temperature of, for example, 20° C. at an outside air temperature of 15° C., the battery charger 110 calculates a pattern in which a temperature rise value at the time of the completion of charge is decreased by 5° C. is calculated as stated above with reference to FIG. 10 and charges the battery in accordance with this pattern. Conversely, the outside air temperature is 25° C. and the battery temperature is 20° C., the battery charger 110 calculates a pattern in which a temperature rise value at the time of the completion of charge is increased by 5° C.

Figure 12:
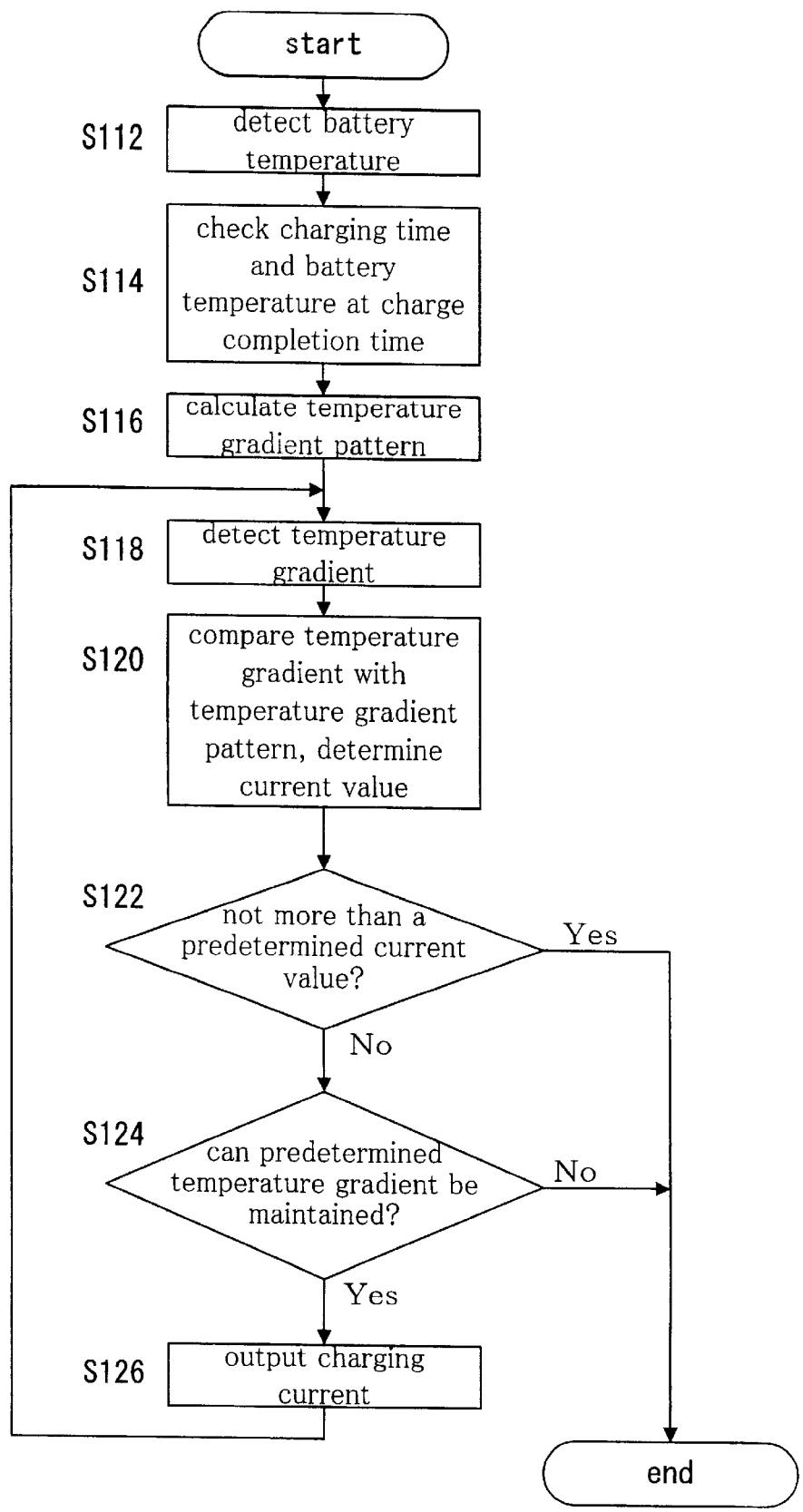
FIG. 12 is a flow chart showing processing in the control section of the battery charger in the second embodiment.

The specific charge control of the battery charger in the second embodiment will be described with reference to FIG. 12.

First, the control section 136 detects the temperature of the battery pack 150 from the temperature detecting section 138 (in S112). Here, it is assumed that outside air temperature is 20° C. and battery temperature is 25° C. Next, charging time and battery temperature at the time of the completion of charge are checked (in S114). In this case, when charging time is 20 minutes, the final temperature rise value of 35 degrees (30 deg+5 deg) is obtained. Thereafter, a temperature rise pattern is calculated (in S116).

The control section 136 differentiates the difference between the temperature value inputted from the previous temperature detecting section and the temperature value inputted this time and obtains a temperature rise value (in S118). The control section 136 then compares this detected temperature rise value with the temperature rise pattern calculated in the step 116 and thereby determines a current value (in S120). Here, if the temperature rise value is lower than the temperature gradient, the current value is increased from the present value. Conversely, if lower, the current value is decreased.

Next, it is determined whether the current value is not more than a predetermined value (in S122). As in the case of the first embodiment, if battery charge is completed and the current value becomes not more than the predetermined value ("Yes" in S122), charge processing is ended. On the other hand, if the current value is not less than the predetermined value ("No" in S122), it is further determined whether a predetermined temperature gradient can be maintained by adjusting the current value, i.e., whether overshoot occurs (in S124). If overshoot occurs ("No" in S124), the processing is ended. If overshoot does not occur ("Yes" in S124), the processing goes to a step 126, whereafter the battery is charged with the current value determined in the step 120 and the charge processing is continued further.

The battery charger in the second embodiment charges a battery while adjusting the current value so that the temperature rise value becomes a temperature rise pattern. Due to this, as stated above with reference to FIG. 9, by optimizing the temperature rise pattern, it is possible to charge the battery so that the battery temperature at the time of the completion of charge may become a target temperature value which the battery is intended to reach (the lowest temperature).

The battery charger in this embodiment sets the temperature rise pattern to be round upward, i.e., sets the temperature rise pattern such that the difference between the battery temperature and the ambient temperature is small, the battery is difficult to cool, the capacity is nearly empty, the temperature rise during battery charger is relatively small and the temperature rise value in the first half of the battery charge is relatively high, and set conversely such that the difference between the battery temperature and the ambient temperature is large, the battery is easily cooled, temperature rise during battery charge is relatively large and the temperature rise value in the second half of battery charge is relatively low. That is, by setting the temperature rise pattern so as to optimize them altogether in cooperation with one another, it is possible to charge the battery so that the battery temperature at the time of the completion of charge may be the lowest.

Figure 14:
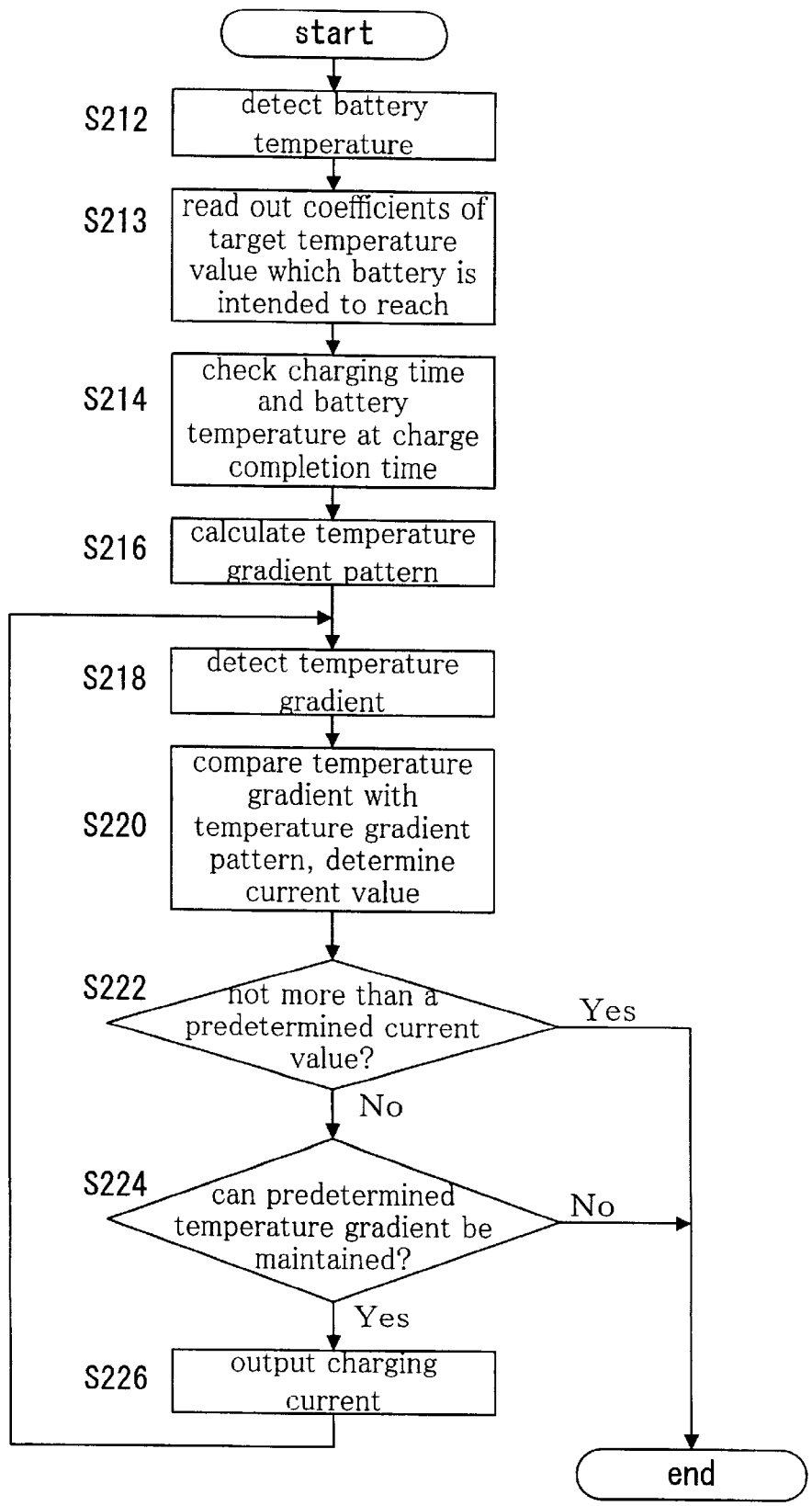
FIG. 14 is a flow chart showing processing in the control section of the battery charger in the third embodiment.

Next, a battery charging method in the third embodiment according to the present invention will be described with reference to FIGS. 13 to 15.

In the second embodiment stated above, the battery charger holds the charging time and final battery temperature rise values shown in FIG. 10. In the third embodiment, by contrast, a battery pack holds border lines each indicating the final temperature when battery charge is completed at the lowest temperature described above with reference to FIG. 9. Namely, the final temperature which the battery reaches when it is completed with charge differs depending on the voltage of the battery pack (the number of battery cells), the type of the battery (nickel metal hydride batteries may have different characteristics), the heat radiation characteristics of the battery pack and the like. Due to this, the battery charger in this embodiment is intended to be capable of charging any battery pack most efficiently by making the battery pack hold the border values (to be referred to as a target temperature values which the battery is intended to reach).

The configurations of a battery charger 210 and battery packs 250A and 250B for the battery charging method in the third embodiment will be described with reference to FIG. 13. The battery pack 250A is provided with a ROM 258a which holds a target temperature value (B1 in FIG. 15) which the battery pack 250A is intended to reach. The battery pack 250B is provided with a ROM 258b which holds a target temperature value (B2 in FIG. 15) which the battery pack 250B is intended to reach. It is noted that the target temperature values B1 and B2 are expressed by a formula of $Y=\beta/(X+\alpha)+\gamma$ and that the values of coefficients $\alpha$, $\beta$ and $\gamma$ are written in the ROM 258a and ROM 258b, respectively.

Meanwhile, a control circuit 230 in the battery charger 210 is provided with a ROM reader 231 for reading out the contents of the above-stated ROM's 258a and 258b. A storage section 239 contains an equation for obtaining a temperature rise pattern. The remaining constituent elements are the same as those in the first embodiment described above with reference to FIG. 4. No description thereto will be, therefore, given herein.

The specific charge control of the charging method in the third embodiment will be described with reference to FIG. 14.

First, the control section 236 of the battery charger 210 detects the temperature of the battery pack 250A from a temperature detecting section 238 (in S212). Here, it is assumed that the battery temperature is 20° C. Next, the coefficients $\alpha$, $\beta$, and $\gamma$ for obtaining the target temperature value B1 are read out from the ROM 258a of the battery pack 250A and a curve of the target temperature value B1 shown in FIG. 15 is calculated (in S213). Then, charging time and battery temperature at the time of the completion of battery charge are checked (in S214) Here, the battery charger 210 is constituted to switch battery charge between quick charge and normal charge. In quick charge, a battery temperature rise value of up to 30 deg is allowed. In normal charge, the battery charge is to be completed with a temperature rise of not more than 25 deg. If normal charge is selected, charging time of 25 minutes is confirmed from the temperature rise value of 25 deg at the time of the completion of charge. On the other hand, if quick charge is set, charge time of 20 minutes is confirmed. Thereafter, a temperature gradient pattern is calculated (in S216). If it is confirmed that charge time is 20 minutes in quick charge, an upward round curve (temperature rise pattern) j is calculated based on the equation in the storage section 239 from a segment i connecting 0 deg and 30 deg in FIG. 15. In the third embodiment, the temperature rise pattern is calculated based on the equation. It is also possible to hold a plurality of patterns instead of the equation and to relate the patterns to thereby obtain a pattern.

The control section 236 obtains a temperature rise value from the difference between the temperature value inputted from the previous temperature detecting section and the temperature value inputted this time (in S218), this detected temperature rise value is compared with the gradient calculated in the step 216 and thereby a current value is determined(in S220). Here, if the temperature rise value is lower than the temperature rise pattern, the current value is increased from the present value. If lower, the current value is decreased.

Next, it is determined whether the current value is not more than a predetermined value (in S222). As in the case of the first embodiment, if battery charge is completed and the current value becomes no more than the predetermined value ("Yes" in S222), charge processing is ended. On the other hand, if the current is no less than the predetermined value ("No" in S222), it is further determined whether the temperature gradient can be maintained by adjusting the current value, i.e., whether overshoot occurs (in S224). If overshoot occurs ("No" in S224), processing is ended. If overshoot does not occur ("Yes" in S224), processing goes to a step 226, whereby the battery is charged with the current value determined in the step 220 and charge processing is continued further.

In the battery charging method in the third embodiment, the battery packs 250A and 250B hold the target temperature values B1 and B2, respectively. Due to this, it is possible to complete charging the battery pack 250A in the shortest time of 20 minutes and charging the battery pack 250B having the target temperature value B2 in the shortest time of 17 minutes (see FIG. 15). Further, in various types of battery chargers, even a battery charger capable of quickly charging a battery in, for example, 20 minutes or that capable of charging a battery in one hour, it is possible to charge the battery so that the battery temperature at the time of the completion of charge may become the target temperature value which the battery is intended to reach (the lowest temperature).

Furthermore, in the battery charging method in the third embodiment, battery charge is conducted based on the data held by the battery packs. Due to this, it is possible to easily change the usage of the battery packs or to newly design battery packs and to allow even a battery charger of an old type to conduct optimum charge control based on the newest data.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A battery charger characterized by comprising:
   a temperature detecting section for detecting a present battery temperature;
   a temperature rise value outputting section for obtaining a temperature rise value from the temperature detected by said temperature detecting section;
   a current value retrieving section for retrieving a current value with which the temperature rise value outputted from said temperature rise value outputting section is constant; and
   a charge control section for charging a battery with the current value retrieved by said current value retrieving section.

2. A battery charger characterized by comprising:
   a storage device storing a target temperature value which a battery temperature is intended to reach;
   a temperature detecting section for detecting a present battery temperature;

a temperature gradient calculating section for calculating a temperature rise gradient from charging time based on a difference between a battery temperature at the beginning of battery charge and said target temperature value held by said storage device;

a temperature rise value outputting section for obtaining a temperature rise value from the temperature detected by said temperature detecting section;

a current value retrieving section for retrieving a current value with which the temperature rise value outputted from said temperature rise value outputting section becomes said temperature rise gradient; and a charge control section for charging the battery with the current value retrieved by said current value retrieving section.

3. A battery charger characterized by comprising:

a storage device storing a target temperature value which a battery is intended to reach;

a temperature detecting section for detecting a present battery temperature;

a temperature rise pattern retrieving section for retrieving a temperature rise pattern for completing battery charge at said target temperature value based on a difference between a battery temperature at the beginning of the battery charge and said target temperature value held by said storage device;

a temperature rise value outputting section for obtaining a temperature rise value from the temperature detected by said temperature detecting section;

a current value retrieving section for retrieving a current value with which the temperature rise value outputted from said temperature rise value outputting section becomes said temperature rise pattern; and a charge control section for charging the battery with the current value retrieved by said current value retrieving section.

4. A battery charger according to claim 3, characterized in that said temperature rise pattern is such that the temperature rise value is relatively high in a first half of battery charge and is relatively low in a second half of battery charge.

5. A battery charger according to claim 3, characterized in that said temperature rise pattern is approximated polygonally.

6. A battery charger according to claim 4, characterized in that said temperature rise pattern is approximated polygonally.

7. A battery charger according to claim 3, characterized in that said target temperature value is a value for completing the battery charge at the lowest temperature.

8. A battery charger according to claims 4, characterized in that said target temperature value is a value for completing the battery charge at the lowest temperature.

9. A battery charger according to claim 5, characterized in that said target temperature value is a value for completing the battery charge at the lowest temperature.

10. A battery charging method for making a battery side hold information on a target temperature value, which a battery is intended to reach, corresponding to charging time and charging the battery by means of a battery charger in accordance with the target temperature value, characterized in that said battery charger comprises:

a storage device storing a temperature rise pattern for completing battery charge at the target temperature value read out from the battery side;

a temperature detecting section for detecting a present battery temperature;

a temperature rise pattern retrieving section for retrieving a temperature rise pattern from said storage device based on a battery temperature at the beginning of the battery charge and charging time;

a temperature rise value outputting section for obtaining a temperature rise value from the temperature detected by said temperature detecting section;

a current value retrieving section for retrieving a current value with which the temperature rise value outputted from said temperature rise value outputting section becomes said temperature rise pattern; and a charge control section for charging the battery with the current value retrieved by said current value retrieving section.

11. A battery charging method according to claim 7, characterized in that said target temperature value is a value for completing the battery charge at the lowest temperature.

* * * * *